United States Patent [19]

Nambu

[11] 3,797,466

[45] Mar. 19, 1974

[54] FUEL INJECTION INTERNAL COMBUSTION ENGINE

[75] Inventor: Shyuya Nambu, Yokohama, Japan

[73] Assignee: Nissan Motor Company, Limited, Tokyo, Japan

[22] Filed: July 21, 1971

[21] Appl. No.: 164,770

[30] Foreign Application Priority Data
Sept. 8, 1970 Japan............................ 45-78656

[52] U.S. Cl. ...... 123/32 ST, 123/32 SP, 123/191 S, 123/193 P
[51] Int. Cl. ............................................. F02b 9/10
[58] Field of Search.......... 123/32 ST, 32 SP, 32 SJ, 123/191 S, 193 CP, 193 P

[56] References Cited
UNITED STATES PATENTS

| | | | |
|---|---|---|---|
| 3,079,901 | 3/1963 | Hallberg | 123/32 SP |
| 3,658,046 | 4/1972 | Winkler | 123/32 ST |
| 3,400,701 | 9/1968 | Tessmer | 123/193 P |
| 3,102,521 | 9/1968 | Slemmons | 123/32 SP |

FOREIGN PATENTS OR APPLICATIONS

| | | | |
|---|---|---|---|
| 525,014 | 4/1955 | Italy | 123/191 S |
| 397,840 | 8/1933 | Great Britain | 123/32 SP |
| 1,283,739 | 12/1962 | France | 123/32 SP |

Primary Examiner—Laurence M. Goodridge
Assistant Examiner—Cort Flint
Attorney, Agent, or Firm—William E. O'Brien; George A. Depaoli; Donal E. McCarthy

[57] ABSTRACT

To make available a fuel internal combustion engine which can be driven with a relatively lean combustible mixture to reduce concentrations of toxic hydrocarbons, carbon-monoxides and nitrogen oxides in engine exhaust gases without impairing combustion efficiency of the engine, the engine is provided with an improved combustion chamber which consists of a usual space usually used as the combustion chamber and an additional space formed in an end wall of a piston. A fuel injection valve and a spark plug spaced from the valve are located in alignment with this additional space so that a major portion of the supplied fuel is distributed to the additional space so as to produce therein a relatively rich combustible mixture which can be readily ignited by the spark plug whereby a relatively lean mixture produced in the usual space of the combustion chamber is ignited by the aid of the flames resulting from the combustion of the rich mixture.

3 Claims, 4 Drawing Figures

INVENTORS
Shyuya Nambu
BY
McCarthy, Depaoli, O'Brien & Price
ATTORNEYS

FUEL INJECTION INTERNAL COMBUSTION ENGINE

This invention relates to a fuel injection internal combustion engine for motor vehicles and, more particularly, to an internal combustion engine of the character in which fuel is admitted directly to combustion chambers of the engine. The invention specifically aims at reducing the proportion of noxious compounds in the engine exhaust gases through improvement made on combustion chambers of the engine, thereby providing a useful solution to vehicular air-pollution problems which are presently at issue.

The internal combustion engine usually includes a plurality of engine cylinders which are cast into an integral cylinder block. A piston is snugly slidably mounted in each of the cylinders and a cylinder head is mounted above the piston crown and secured to the cylinder block. A combustion chamber is defined by the inner walls of the cylinder, piston and cylinder head, and the fuel is mixed uniformly with air in the combustion chamber so as to produce a combustible mixture therein. An air-to-fuel ratio of this combustible mixture is closely related to the concentrations of the noxious compounds such as unburned hydrocarbons and carbon-monoxides and oxides of nitrogen contained in the engine exhaust gases. As regards the gasoline-powered engines, the air-to-fuel ratio is usually prescribed to range between 10:1 to 17:1 in consideration of the fireability and inflamability of the combustible mixture as well as the performance characteristics of the engine. It is, in this instance, known that, the richer the combustible mixture, the higher are the concentrations of the unburned hydrocarbons and carbon-monoxides and that the concentration of the nitrogen oxides peaks up at about 15:1 air-to-fuel ratio. The concentrations of the hydrocarbons and carbon-monoxides decrease as the air-to-fuel ratio increases (or the combustible mixture becomes leaner). The concentration of the nitrogen oxides, on the other hand, decrease as the air-fuel-ratio becomes higher or lower than 15:1 but still remains at considerably high levels even though the combustible mixture is leand out to a limit air-to-fuel ratio of about 17:1 in the working range.

From the view point of reducing the unburned hydrocarbons and carbon-monoxides, therefore, it is desired that the engine be driven with a combustible mixture having air-to-fuel ratios lower than the aforesaid working range. To reduce the nitrogen oxides, it is desired that the engine be supplied with a combustible mixture having relatively low or extremely high air-to-fuel ratios.

It is, thus, an object of this invention to provide an improved fuel injection internal combustion engine in which the concentrations of the unburned hydrocarbons and carbon-monoxides and the nitrogen oxides contained in the engine exhaust gases are reduced to minimums through use of a combustible mixture which is leaner than usual. Where such lean combustible mixture is used to drive the internal combustion engine, it is of critical importance that the firability and inflamability of the combustible mixture are not impaired.

Another object of this invention is, accordingly, to provide an improved fuel injection internal combustion engine which can be driven with a relatively lean combustible mixture without detriment to the firability and inflamability of the mixture.

Still another object of this invention is to provide an improved fuel injection internal combustion engine which is suited for air-pollution preventive purposes and which is simple in construction and economical to manufacture.

To achieve these and other objects, this invention proposes to improve the combustion chambers with a view to enabling the lean combustible mixture to be ignited and burned at satisfactory efficiencies. The improved combustion chamber consists of a usual space defined by the inner walls of cylinder, piston and cylinder head and an additional space formed in the end wall of the piston and immediately contiguous to the usual space. A fuel injection valve is mounted in the cylinder head, directed to the combustion chamber above the additional space. Fuel is admitted directly to the combustion chamber through this fuel injection valve at controlled rates and timings. An air intake port opens into the combustion chamber through an air intake valve to supply air thereto. The fuel from the fuel injection valve and the air from the air intake port are mixed with each other so as to produce a combustible mixture. This mixture is, as previously noted, a relatively lean mixture having relatively high air-to-fuel ratios. A spark plug is mounted on the cylinder head at a spacing from the fuel injection valve and has a central electrode which projects into the additional space of the combustion chamber. The fuel injection valve is arranged to admit the fuel to the combustion chamber toward the central electrode of the spark plug so that a major portion of the supplied fuel is distributed to the additional space of the combustion chamber and is therein mixed with the air to produce therein a relatively rich combustible air-fuel mixture. This combustible mixture is fired and burned by means of the central electrode so that combustion takes place in the combustion chamber. The remaining minor portion of the supplied fuel is distributed to the usual space forming part of the combustion chamber. This fuel is also mixed with the air drawn from the air intake port, producing an air-fuel mixture which in itself is unable to be fired because of the considerably low proportion of the fuel component. This lean mixture is fired by the aid of the flames resulting from the combustion of the combustible mixture in the additional space.

In order that the combustible mixture in the additional space be directed toward the central electrode of the spark plug at an increased efficiency, an impetus may be positively given to the combustible mixture produced in the additional space. Such impetus may be induced by establishing a vortex flow in the combustion chamber or by ejecting the fuel toward the central electrode which projects into the additional space. Where the latter scheme is adopted, the fuel injection valve may be located adjacent to and directed toward the central electrode of the spark plug.

The features and advantages of the fuel injection internal combustion engine according to this invention will become apparent from the following description taken in conjunction with the accompanying drawings in which.

Figure 1:
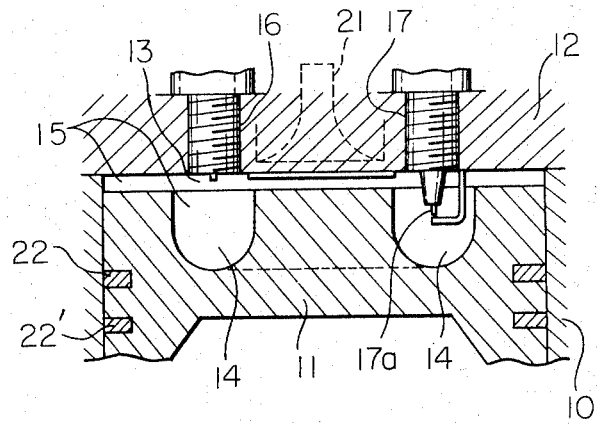
FIG. 1 is a longitudinal sectional view showing essential parts of the fuel injection internal combustion engine according to this invention.
Figure 2:
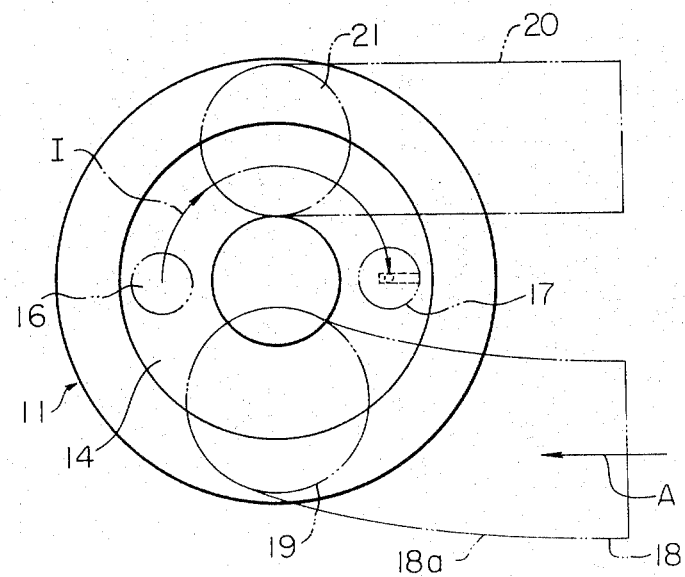
FIG. 2 is a top plan view of a piston arrangement of the engine shown in FIG. 1.

Referring to FIGS. 1 and 2, only one cylinder arrangement of the fuel injection internal combustion engine is shown for the sake of simplicity although the engine is usually provided with a plurality of substantially identical cylinder arrangements which are combined in an integral block.

As shown, the engine includes an engine cylinder 10, a piston 11 axially slidably in the bore of cylinder and a cylinder head 12 mounted above the piston, as customary. The inner walls of the cylinder 10, piston 11 and cylinder head 12 define a usual space 13 which forms a combustion chamber in the usual internal combustion engines. In the engine according to this invention, the piston 11 has formed in its end wall an additional space 14 which is immediately contiguous to the usual space 13 so as to form a continual combustion chamber 15 as a whole. This additional space 14 is, in this embodiment, shown as an annular groove formed in the end wall of the piston 11 for the reason to be described later.

The cylinder head 12 has mounted therein a fuel injection valve 16 through which fuel is admitted to the combustion chamber 15. The fuel injection valve 16 is located to overlie the additional space 14 of the combustion chamber 15. The fuel is admitted to the combustion chamber 15 through this valve 16 at timings scheduled in synchronism with operating cycles of the engine and at rates regulated in accordance with loads applied to the engine during operation.

The cylinder head 12 has also mounted therein a spark plug 17 having a central electrode 17a which projects into and terminates in the annular groove 14 of the combustion chamber 15 as shown. The central electrode 17a is electrically connected to a high-tension current generator (not shown) and is thereby fired at scheduled timings as usual.

An air intake port 18 opens into the combustion chamber 15 through an air intake valve 19 so as to supply air thereto. The supplied air is mixed with the fuel when it passes through the fuel injection valve 16 so as to produce an air-fuel mixture in the combustion chamber 15. The air intake port 18 extends in a direction of arrow A and merges into its leading end portion 18a curved toward the air intake valve 19, as seen in FIG. 2. Since, in this instance, the groove 14 extends annularly in the piston 11, the air admitted to the combustion chamber 15 is caused to swirl in this groove, thereby establishing a vortex flow of the air-fuel mixture produced therein. The air-fuel mixture is in this manner given an impetus toward the central electrode 17a as indicated by arrow I in FIG. 2. This vortex flow is maintained even after the air intake valve 19 is closed due to a force of inertia. For the purpose of increasing the impetus to the air-fuel mixture in the annular groove 14, the fuel injection valve 16 may be angled so as to guide the fuel in this particular direction of the vortex flow.

An exhaust port 20 leads from the combustion chamber 15 through an exhaust valve 21 to discharge the engine exhaust gases to the open air. Designated by reference numerals 22 and 22' are split sealing rings which are installed in annular grooves cut into the outer peripheral wall of the piston 11 as customary.

During operation, a major portion of the fuel admitted from the valve 16 to the combustion chamber 15 is distributed to the annular groove 14 due to the vortex flow established therein. It is to be noted in this instance that, since the annular groove 14 is defined by peripheral walls on both side thereby, the supplied fuel is distributed to the usual space 13 only in a limited proportion so that the air-fuel mixture produced in the annular groove 14 is richer than a mixture which would be produced if the supplied fuel is totally mixed with the supplied air. The combustible air-fuel mixture thus produced in the annular groove 14 is hauled to the central electrode 17a of the spark plug 17, entrained on the vortex flow. The spark plug 17 is fired and the combustible mixture in the annular groove 14 ignited, so that combustion now takes place in the annular groove.

The remaining minor portion of the supplied fuel is distributed to the usual space 13 and mixed with the air from the air intake port 18 so as to produce an air-fuel mixture leaner than the mixture which would be produced if the supplied fuel is totally mixed with the air. Thus, the mixture produced in the usual space 13 has an extremely high air-to-fuel ratio and, as a consequence, is unable to be ignited for itself. This air-fuel mixture is ignited by the aid of the flames propagating in the usual space through combustion of the combustible mixture in the annular groove 14. The combustion of the air-fuel mixture throughout the combustion chamber 15 is effected in this manner.

It will now be appreciated from the foregoing description that, since the combustible air-fuel mixture produced in the annular groove 14 is rich enough to be ignited by the firing of the spark plug 17 and since the mixture produced in the usual space 13 is too lean to be ignited for itself, the mean air-to-fuel ratio of the mixtures in the usual space and the annular groove can be increased to a considerably degree falling within a combustible range. The hydrocarbons and carbon-monoxides are burned practically completely and the nitrogen oxides are produced in an extremely low concentration. The exhaust gases thus containing a minimum of pollutants is discharged from the engine through the exhaust valve 21 and the associated exhaust port 20.

Figure 3:
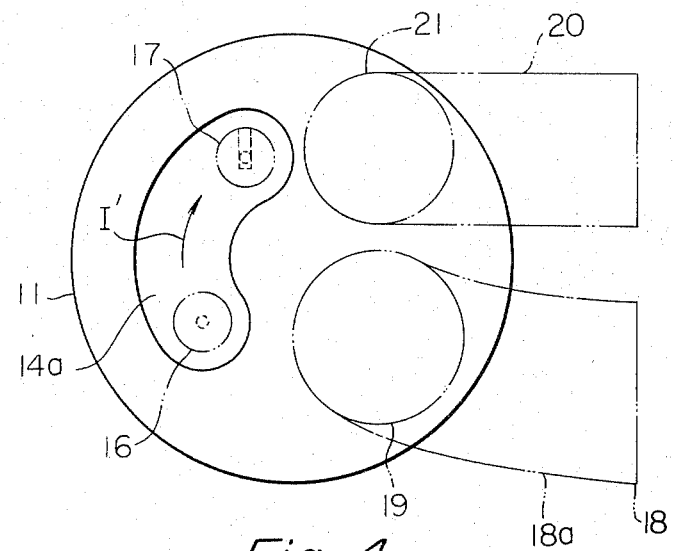
FIGS. 3 and 4 are similar to FIG. 2 but shows modifications of the engine.
Figure 4:
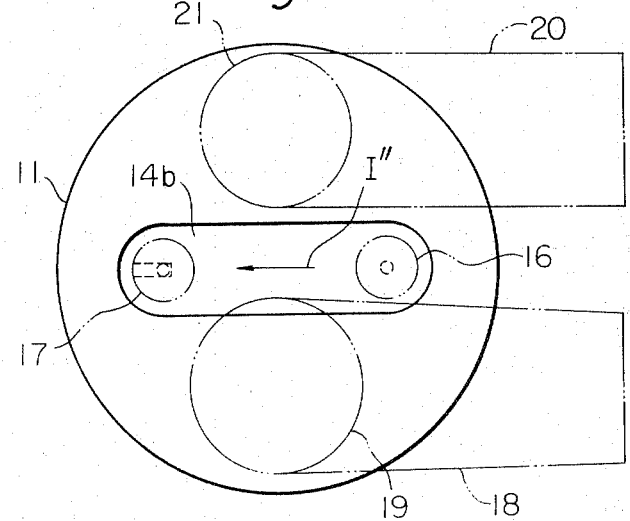

FIGS. 3 and 4 now illustrate modifications of the fuel injection internal combustion engine according to this invention.

In the modification shown in FIG. 3, the additional space which is denoted by reference numeral 14a is curved about an axis of the piston 11 to form a curved groove having closed ends. The fuel injection valve 16 is so located as to overlie one end portion of the curved groove 14a while the spark plug 17 is so located as to have its central electrode (not shown) terminating in the other end portion of the groove 14a. The fuel injection valve 16 and the spark plug 17 are located at a relatively close spacing from each other so that an impetus is given to the combustible air-fuel mixture in the direction of arrow I' not only by the vortex flow established by the air passed from the curved air intake port 18 but by the injection of the fuel toward the spark plug 17.

In the modification shown in FIG. 4, the additional space is configured as an elongated groove 14b extending unidirectionally or diametrically of the piston 11. The fuel injection valve 16 and the spark plug 17 are located to be aligned with both end portions of this elongated groove 14b. The air intake port 18 is herein illustrated to extend straight to the air intake valve 19 so that the impetus is imparted to the combustible air-fuel mixture by the injection of the fuel in a direction of arrow I''.

The operations of the engine shown in FIGS. 3 and 4 are essentially similar to the operation of the engine shown in FIGS. 1 and 2 previously described.

The additional space forming part of the combustion chamber in the engine according to this invention may be configurated in any desired manner insofar as the impetus is given to the air-fuel mixture toward the central electrode in the spark plug terminating in the additional space.

In any embodiment thus far described, the fuel injection valve may be arranged and angled in a manner to admit the fuel substantially in line with a direction in which the additional space extends toward the central electrode of the spark plug to provide the impetus to the air-fuel mixture in the additional space.

The engine constructed in accordance with this invention is advantageous not only for the purpose of reducing the concentration of the toxic compounds in the engine exhaust gases without impairring the combustion efficiency but for fuel economy purposes especially because the mixture significantly leaner than usual can be supplied to the engine during light-load and/or low-speed operations of the engine.

What is claimed is:

1. A fuel injection internal combustion engine for motor vehicles in which each cylinder arrangement comprises:
    a cylinder;
    a cylinder head mounted on said cylinder, said cylinder head defining a flat plane which defines the upper limits of the cylinder;
    an air intake passage having a downstream end portion curved and opening into said cylinder at said cylinder head to provide a curved flow of air in said cylinder;
    a piston within said cylinder to provide a space between said cylinder head and said piston, said piston having formed in its end wall facing said cylinder head a groove which is immediately contiguous to said space to provide a combustion chamber, said groove extending along said flow of air and having an upstream portion and a downstream portion with respect to said flow of air;
    a fuel injection nozzle mounted in said cylinder head and disposed above said upstream portion;
    a spark plug mounted in said cylinder head and having a central electrode projecting into said groove at said downstream portion when said piston is at top dead center;
    an exhaust port leading from said combustion chamber and opened to the open air; and wherein said groove is curved about an axis of said piston to form a curved groove having closed end.

2. A fuel injection internal combustion engine as claimed in claim 1, wherein said groove extends annularly to form an annular groove.

3. A fuel injection internal combustion engine as claimed in claim 1, wherein said fuel injection valve is angled to admit fuel into said combustion chamber in a direction substantially in line with the direction in which said groove extends toward said central electrode.

* * * * *